Jan. 24, 1939.　　　E. M. GODFREY, JR　　　2,144,623
TIRE TREAD CUTTING MACHINE
Filed Feb. 8, 1936　　　2 Sheets-Sheet 2
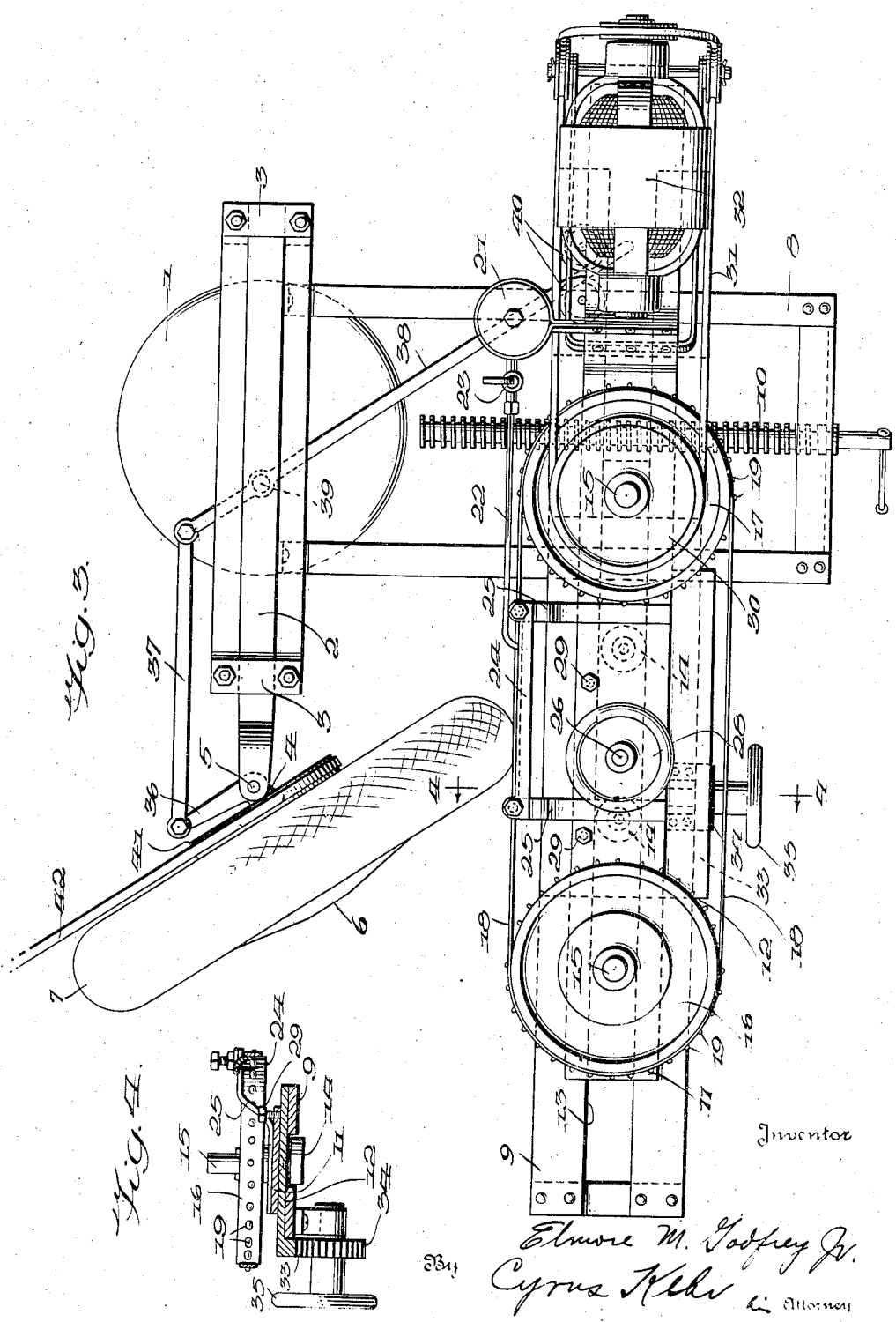

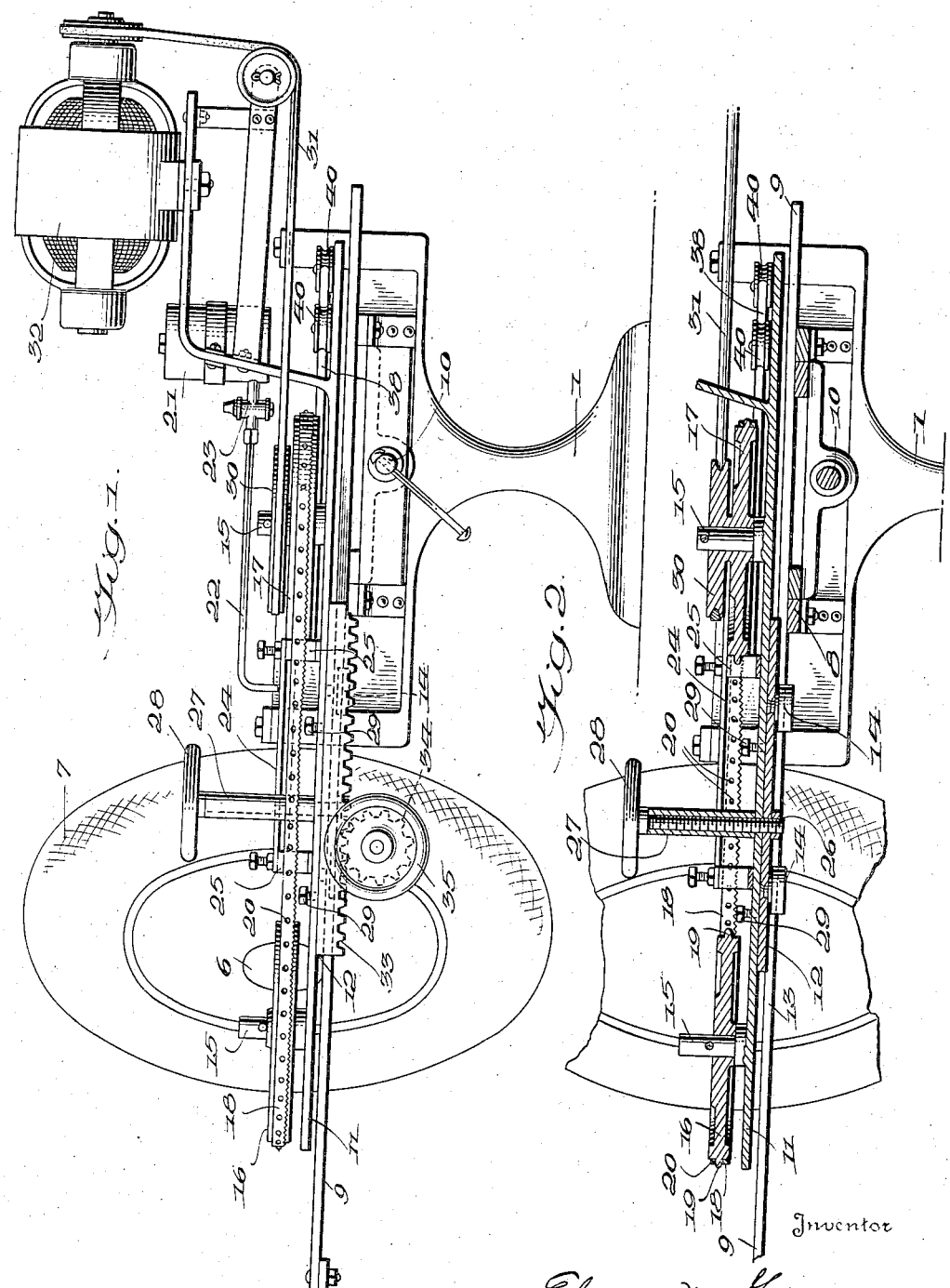

Patented Jan. 24, 1939

2,144,623

UNITED STATES PATENT OFFICE 2,144,623

TIRE TREAD CUTTING MACHINE

Elmore M. Godfrey, Jr., Knoxville, Tenn.

Application February 8, 1936, Serial No. 63,026

19 Claims. (Cl. 164—35)

This invention relates to an improvement in tire tread cutting machines, of the type used for cutting the treads off of automobile tire casings preparatory to retreading the casing.

The object of the invention is to provide for removing the tread surface of a pneumatic tire casing by a continuous operation, making selective cuts of the desired thickness from different peripheral portions of the tire, while the latter is rotated relative to the cutting blade or saw. A band knife or saw preferably is provided in this invention, which is adjusted to make the desired cut and operates continuously as the tire casing is rotated relative thereto, provision being made to hold the knife or saw in contact with the tire casing and against deflection to remove a predetermined portion of the tread of the tire in a positive manner.

Another object of the invention is to provide for removing transversely selected portions of the tire casing by relative adjustment between the tire casing and cutting knife or saw, so as to make peripheral cuts from the transverse center of the tread and from lateral portions of the tread, in order to remove the complete tread surface of the tire casing without flattening the same, which breaks the fibers on the inside of the casing and greatly damages the wearing properties of the retreaded tire.

One form of my invention is illustrated in the accompanying drawings, in which:

Fig. 1 is a side elevation of the complete machine.

Fig. 2 is a vertical sectional view thereof.

Fig. 3 is a top plan view thereof.

Fig. 4 is a transverse sectional view, on the line 4—4 of Fig. 3.

The invention utilizes a suitable support or stand designated generally by the numeral 1 upon which is mounted a wheel axle 2 secured to the stand 1 by suitable brackets 3. The axle 2 is of the type of a front wheel axle of an automobile, having a swinging journal 4 pivoted as at 5 to the main portion of the axle 2, and which journal 4 receives a hub 6 of a wheel, on which wheel the tire 7 is mounted for the removal of the tread portion thereof. The wheel is of the demountable type, or it may be of the removable-rim type, but in either event, the tire 7 is capable of ready removal after completion of the tread cutting operation. The tire is mounted on the rim of the wheel and preferably is inflated just sufficiently to maintain its usual contour, without flattening appreciably during the cutting operation, which prevents injury to the internal fiber structure of the tire that would be caused if the latter should be flattened during the cutting of the tread portion thereof.

Extending laterally from the upper portion of the stand 1 is a supporting frame 8 carrying a saw frame 9, which extends transversely relative to the supporting frame 8, being adjustable by means of a hand screw 10.

Extending lengthwise of the saw frame 9 is a base plate 11 which is carried by a guide plate 12 supported directly on the saw frame 9, as shown particularly in Fig. 2. The saw frame 9 has a guide slot 13 therein receiving rollers 14 mounted on the underside of the guide plate 12 for guiding the longitudinal movement of the base plate 11 relative to the saw frame 9.

Mounted upon journals 15 on the base plate 11 are band wheels 16 and 17, around which a band knife or saw 18 travels. While this is termed a "band saw" in this specification and may be provided with cutting teeth, it is ground down to knife edge and is without set in the blade, and thus, is capable of cutting the rubber tread. The band wheels 16 and 17 have peripheral projections 19 thereon which are received in holes 20 in the band saw 18. These projections and holes serve to provide better driving of the band saw, and the holes also serve another advantage in that they receive and distribute water along the surface of the saw, keeping the saw wet for better cutting action on the rubber.

For supplying water to the saw adjacent the point of cutting, a water container 21 is carried on the frame structure, and has a tube 22 extending therefrom, as shown in Figs. 1 and 3, which tube drops water directly onto the saw blade adjacent the point of cutting, the flow being regulated by a valve 23.

In order to stiffen the blade at the point of contact with the tire, a guide 24 is provided and extends lengthwise of the saw blade 18, as shown in Figs. 3 and 4. The opposite ends of the guide 24 are mounted on brackets 25, carried by the base plate 11, so as to be adjustable therewith. As shown in Fig. 4, the guide 24 is concavo-convex in cross-section, in order to turn the strip of rubber removed by the saw, away from the surface of the tire and to act as a guide therefor.

In order to securely fasten the base plate 11, carrying the saw, to the guide plate 12, a fastening screw 26 has threaded engagement with the guide plate 12 and extends through a sleeve 27, being provided with a hand wheel 28, which may bear upon the sleeve 27 to form a clamp between the base plate 11 and the guide plate 12 to hold these parts securely together. Upon loosening the screw 26, the base plate 11 may be tilted relative to the guide plate 12 by means of adjusting screws 29 threaded through the base plate 11 into engagement with the upper surface of the guide plate 12, in order to tilt the saw relative to the tire, when desired, in making a cut. After adjusting the screws 29 for the proper and desired tilting of the saw, the screw 26 should be tightened again, in order to securely fasten the plates 11 and 12 together.

The saw may be driven in any suitable manner, as for instance, by a pulley 30 attached to the band wheel 17 and receiving a belt 31 which is driven by an electric motor 32.

The base plate 11 may be adjusted lengthwise relative to the saw frame 9 in order to present the saw in the proper relation to the tire for cutting from one side or another or the center of the tire, for which purpose, the guide plate 12 is provided with a rack 33, with which a pinion 34 meshes, as shown in Fig. 4, and is adapted to be turned by a hand wheel 35 to feed the guide plate 12 and base plate 11 lengthwise relative to the saw frame 9. This action adjusts the saw to the proper and desired cutting position, after which it may be fed into the tire, by adjusting the saw frame 9 forward along the supporting frame 8 by means of the hand screw 10, and thereby adjusting the depth of cut of the saw relative to the tire surface.

In order to shift the tire 7 simultaneously with the lengthwise adjustment of the base plate 11 and saw 18, the axle on which the wheel is mounted is of the type having a pivot or knuckle 5, from which an arm 36 projects. A link 37 has one end pivoted to the arm 36, and the other end is pivoted to one end of a lever 38, which lever is pivoted at 39 to the stand 1. The opposite end of the lever 38 is received between a pair of pins or rollers 40 carried by the base plate 11, for shifting of the lever 38 automatically, upon lengthwise adjustment of the base plate, whereby to swing the tire 7 to its proper position for cutting, simultaneously with the adjustment of the saw.

Instead of flattening the tire tread, which is objectionable because of its breaking action on the internal fibers of the tire, it is preferable to make several cuts in removing the tire tread, and this is accomplished quickly and simply with my invention, by shifting the tire and saw to different relative positions in making the cuts. For instance, a cut may be made at the center of the periphery and then additional cuts made on the transverse sides, according to the amount of tread surface which it is desired to remove. Either three or five cuts may be made in this way, as desired, in very short time, consuming only a few minutes, and thus completely removing the transverse area of the tread surface, but without the injurious effect of flattening the tire.

It is obvious that the tire should be rotated against the saw and, while it may be turned by hand, it is preferable that it be power driven at slow speed, for which purpose the hub 6 may be provided with a pulley 41 receiving a belt 42, driven by a suitable source of power, such as an electric motor for instance, for rotating the tire in the different adjusting positions thereof.

I claim:

1. In a tire tread cutting machine, the combination of means for supporting a tire in an upright position, an elongated knife extending transversely of the tire supporting means for removing peripheral portions of the tire, means for adjusting the knife transversely to opposite sides of the medial plane of the tire holding means, and means for causing transversely relative swinging adjustment between the tire and knife to cut different transverse peripheral portions of the tire.

2. In a tire tread cutting machine, the combination of tire holding means, a band knife, mounting means for said band knife, means for supporting the band knife for lengthwise bodily adjustment transversely relative to the tire holding means, and means for adjusting said band knife bodily toward and from the tire holding means for varying the cut of the tire.

3. In a tire tread cutting machine, the combination of tire holding means, a band knife, mounting means for said band knife, means for supporting the band knife for bodily adjustment transversely relative to the tire holding means, means for adjusting said band knife bodily toward and from the tire holding means for varying the cut of the tire, and means for causing swinging motion of the tire holding means to different angular positions relative to the knife for presenting different lateral portions of the tire to the knife for cutting.

4. In a tire tread cutting machine, the combination of tire holding means arranged to hold a tire approximately in a vertical position, means mounting said tire holding means for swinging movement to different vertical positions, a cutting knife, means mounting said cutting knife, supporting means for said knife mounting means so constructed and arranged as to adjust the knife transversely relative to the tire holding means, means for adjusting said knife mounting means toward and from the tire holding means, and means for coordinating the adjusting movements of the knife mounting means with the swinging movements of the tire holding means.

5. In a tire tread cutting machine, the combination with tire holding means, of a saw frame, a base plate, means for adjusting the base plate longitudinally of the saw frame, band wheels mounted on the base plate, and a band cutter carried by the band wheels in position to cut a tire on the tire holding means.

6. In a tire tread cutting machine, the combination with tire holding means, of a saw frame, a base plate, means for adjusting the base plate longitudinally of the saw frame, band wheels mounted on the base plate, a band cutter carried by the band wheels in position to cut a tire on the tire holding means, and means for tilting the base plate relative to the saw frame for varying one edge of the band cutter relative to the other.

7. In a tire tread cutting machine, the combination with tire holding means, of a saw frame, a base plate mounted on the saw frame, means mounting the base plate for adjustment longitudinally of the saw frame, means for tilting the base plate transversely relative to the saw frame, band wheels mounted on the base plate, and a band saw carried by the band wheels.

8. In a tire tread cutting machine, the combination of a saw frame, a base plate mounted on the saw frame, means mounting the base plate for adjustment longitudinally of the saw frame, means for tilting the base plate transversely relative to the saw frame, band wheels mounted on the base plate, a band saw carried by the band wheels, a saw guide bearing against an edge of the saw approximately at the point of cutting, and brackets carried by the base plate for supporting said saw guide.

9. In a tire tread cutting machine, the combination of means for holding a tire, a saw frame, means for bodily adjusting the saw frame toward and from the tire holding means, a base plate carried by the saw frame, means for adjusting the base plate longitudinally of the saw frame and relative to the tire holding means, and a cutter carried by the base plate.

10. In a tire tread cutting machine, the combination of means for holding a tire, a saw frame, means for bodily adjusting the saw frame toward and from the tire holding means, a base plate carried by the saw frame, means for adjusting the base plate longitudinally of the saw frame and transversely relative to the tire holding means, a cutter carried by the base plate, and means operatively connecting the base plate with the tire holding means for causing turning movement of the tire holding means relative to the cutter upon transverse adjustment thereof.

11. In a tire tread cutting machine, the combination of tire holding means, means pivotally supporting said tire holding means for swinging movement to different vertical positions, means for supporting a cutter for adjustment transversely relative to the tire holding means, and means operatively connecting the tire holding means with the cutter supporting means for swinging the tire holding means to different vertical positions upon transverse adjustment of the cutter.

12. In a tire tread cutting machine, the combination of tire holding means, an elongated band cutter extending transversely of said tire holding means, and means mounting said cutter and tire holding means for swinging motion of both said cutter and tire holding means presenting the cutter to different portions of the tire on opposite sides of the medial plane thereof.

13. In a tire tread cutting machine, the combination of tire holding means arranged to support a tire, a cutter extending transversely of said tire holding means, means mounting said tire holding means for swinging movement to different vertical positions, and means mounting said cutter for adjustment toward and from the tire holding means.

14. In a tire tread cutting machine, the combination of tire holding means arranged to support a tire approximately vertically, an elongated band cutter extending transversely of said tire holding means and operating approximately in a horizontal plane, means mounting said tire holding means for swinging movement to different vertical positions, and means mounting said cutter for adjustment toward and from the tire holding means.

15. In a tire tread cutting machine, the combination of tire holding means arranged to support a tire approximately vertically, an elongated band cutter extending transversely of said tire holding means and operating throughout its length approximately in a horizontal plane, means mounting said tire holding means for swinging movement to different vertical positions, and means mounting said cutter for adjustment transversely of and toward and from the tire holding means.

16. In a tire tread cutting machine, the combination of tire holding means arranged to support a tire approximately vertically, an elongated band cutter extending transversely of said tire holding means and operating approximately in a horizontal plane, means mounting said tire holding means for swinging movement to different vertical positions, means mounting said cutter for adjustment transversely of and toward and from the tire holding means, and means operatively connecting the tire holding means with the cutter mounting means for swinging the tire holding means upon transverse adjustment of the cutter.

17. In a tire tread cutting machine, the combination with tire holding means, of a support, band wheels carried by said support, a band cutter extending about said band wheels in position to cut a tire on the tire holding means, a frame having a trackway thereon, means for guiding said support along the trackway, and gearing connected with said support for moving the same along the trackway.

18. In a tire tread cutting machine, the combination with tire holding means, of a support, band wheels carried by said support, a band cutter extending about said band wheels in position to cut a tire on the tire holding means, a frame having an elongated trackway thereon, guides attached to said support and engaging the trackway, and rack and pinion means connected with the support and frame for moving said support along the trackway.

19. In a tire tread cutting machine, the combination of tire holding means, a supporting frame, a saw frame carried by said supporting frame, means for moving said saw frame outwardly and inwardly on the supporting frame from and toward the tire holding means, a base plate carrying tread cutting means, the saw frame having a trackway thereon, guides on the base plate cooperating with said trackway, and rack and pinion means connected with the base plate and saw frame for moving said base plate along the trackway.

ELMORE M. GODFREY, Jr.